(12) United States Patent
Snyder

(10) Patent No.: US 11,255,215 B2
(45) Date of Patent: Feb. 22, 2022

(54) GAS TURBINE ENGINE WITH MICROCHANNEL COOLED ELECTRIC DEVICE

(71) Applicant: Rolls-Royce North American Technologies Inc., Indianapolis, IN (US)

(72) Inventor: Douglas J. Snyder, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 689 days.

(21) Appl. No.: 16/027,488

(22) Filed: Jul. 5, 2018

(65) Prior Publication Data

US 2019/0010824 A1 Jan. 10, 2019

Related U.S. Application Data

(60) Provisional application No. 62/529,173, filed on Jul. 6, 2017.

(51) Int. Cl.
| | |
|---|---|
| *H02K 1/20* | (2006.01) |
| *H02K 5/20* | (2006.01) |
| *F01D 15/10* | (2006.01) |
| *F02C 3/10* | (2006.01) |
| *F02K 3/06* | (2006.01) |
| *H02K 7/18* | (2006.01) |
| *H02K 9/06* | (2006.01) |
| *F02C 7/12* | (2006.01) |
| *F01D 25/12* | (2006.01) |

(52) U.S. Cl.
CPC ............. *F01D 15/10* (2013.01); *F01D 25/12* (2013.01); *F02C 3/10* (2013.01); *F02C 7/12* (2013.01); *F02K 3/06* (2013.01); *H02K 1/20* (2013.01); *H02K 5/20* (2013.01); *H02K 7/1823* (2013.01); *H02K 9/06* (2013.01); *F05D 2220/323* (2013.01); *F05D 2220/76* (2013.01); *F05D 2260/20* (2013.01); *F05D 2260/201* (2013.01); *F05D 2260/204* (2013.01)

(58) Field of Classification Search
CPC .. H02K 1/20; H02K 5/20; H02K 9/02; H02K 9/04; H02K 9/06; F01D 15/10; F02C 3/10; F02C 7/18; F02K 3/06
USPC ............................. 310/52, 59, 60 A, 64, 54
See application file for complete search history.

(56) References Cited

U.S. PATENT DOCUMENTS

| | | | |
|---|---|---|---|
| 2,803,943 | A | 8/1957 | Sinclair et al. |
| 3,720,060 | A | 3/1973 | Davies et al. |
| 3,807,815 | A | 4/1974 | Kasabian |

(Continued)

FOREIGN PATENT DOCUMENTS

| | | |
|---|---|---|
| DE | 102010014968 A1 | 10/2011 |
| EP | 798454 A2 | 10/1997 |

(Continued)

OTHER PUBLICATIONS

JP-2010110025-A (English Translation) (Year: 2010).*

*Primary Examiner* — Quyen P Leung
*Assistant Examiner* — Alexander Moraza
(74) *Attorney, Agent, or Firm* — Barnes & Thornburg LLP

(57) ABSTRACT

A gas turbine engine includes an electrical device and a microchannel cooling system in communication with the electrical device to remove heat.

20 Claims, 5 Drawing Sheets

(56) References Cited

U.S. PATENT DOCUMENTS

| | | | |
|---|---|---|---|
| 4,347,451 A * | 8/1982 | Mizuyama | H02K 5/128 |
| | | | 310/59 |
| 4,497,171 A | 2/1985 | Corrigan et al. | |
| 4,804,288 A | 2/1989 | Tiernan, Jr. | |
| 5,182,960 A | 2/1993 | Chary | |
| 5,309,029 A | 5/1994 | Gregory et al. | |
| 5,867,979 A | 2/1999 | Newton et al. | |
| 6,064,123 A | 5/2000 | Gislason et al. | |
| 6,729,140 B2 | 5/2004 | Care et al. | |
| 6,851,267 B2 | 2/2005 | Bruno et al. | |
| 6,914,344 B2 | 7/2005 | Franchet et al. | |
| 7,484,354 B2 | 2/2009 | Stretton | |
| 8,198,744 B2 | 6/2012 | Kern et al. | |
| 8,424,280 B2 | 4/2013 | Moore et al. | |
| 9,121,351 B2 | 9/2015 | Ress, Jr. et al. | |
| 9,657,646 B2 | 5/2017 | Wotzak | |
| 2005/0132693 A1 | 6/2005 | Macfarlane et al. | |
| 2006/0101804 A1 | 5/2006 | Stretton | |
| 2006/0225431 A1 | 10/2006 | Kupratis | |
| 2006/0260323 A1 | 11/2006 | Moulebhar | |
| 2007/0035137 A1 | 2/2007 | Matsukuma et al. | |
| 2007/0137219 A1 | 6/2007 | Linet et al. | |
| 2007/0151258 A1 | 7/2007 | Gaines et al. | |
| 2008/0120980 A1 | 5/2008 | Gemin et al. | |
| 2008/0148881 A1 | 6/2008 | Moniz et al. | |
| 2008/0265580 A1 | 10/2008 | Sharp | |
| 2009/0007568 A1 | 1/2009 | Eccles et al. | |
| 2009/0175716 A1 | 7/2009 | Vetters | |
| 2009/0288421 A1 | 11/2009 | Zeiner et al. | |
| 2009/0290976 A1 | 11/2009 | Suciu et al. | |
| 2012/0133150 A1 | 5/2012 | Dooley et al. | |
| 2013/0020888 A1 * | 1/2013 | Anthony | H01F 27/10 |
| | | | 310/52 |
| 2013/0296092 A1 | 11/2013 | Beckner et al. | |
| 2014/0150401 A1 | 6/2014 | Venter | |
| 2014/0224063 A1 | 8/2014 | Alford et al. | |
| 2014/0265666 A1 * | 9/2014 | Shoykhet | H02K 9/19 |
| | | | 310/59 |
| 2014/0328668 A1 * | 11/2014 | Anthony | H02K 99/10 |
| | | | 415/10 |
| 2014/0356135 A1 | 12/2014 | French et al. | |
| 2014/0367970 A1 | 12/2014 | Van Der Ham et al. | |
| 2016/0047319 A1 | 2/2016 | Gieras et al. | |
| 2016/0118862 A1 * | 4/2016 | Maki-Ontto | H02K 1/20 |
| | | | 310/59 |
| 2017/0297727 A1 | 10/2017 | Niergarth et al. | |

FOREIGN PATENT DOCUMENTS

| | | | |
|---|---|---|---|
| EP | 2412939 A1 | | 2/2012 |
| GB | 1127659 A | | 9/1968 |
| GB | 2444838 A | | 6/2008 |
| JP | 2010110025 A | * | 5/2010 |
| WO | 1995002120 A1 | | 1/1995 |

* cited by examiner

GAS TURBINE ENGINE WITH MICROCHANNEL COOLED ELECTRIC DEVICE

CROSS-REFERENCE TO RELATED APPLICATION

This application claims the benefit of priority to U.S. Provisional Application No. 62/529,173, filed Jul. 6, 2017, the entire disclosure of which is hereby incorporated by reference, including but without limitation, those portions directed to microchannel cooling of gas turbine engine components.

FIELD OF THE DISCLOSURE

The present disclosure relates generally to gas turbine engines, and more specifically to auxiliary electric power devices of gas turbine engines.

BACKGROUND

Gas turbine engines are used to power aircraft, watercraft, electrical generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Exhaust products of the combustion reaction in the combustor are directed into the turbine where work is extracted to drive the compressor and, sometimes, an output shaft, fan, or propeller. Portions of the work extracted from the turbine can be used with various subsystems such as motor-generators.

SUMMARY

The present disclosure may comprise one or more of the following features and combinations thereof.

According to an aspect of the present disclosure, a gas turbine engine for use in an aircraft may include a low pressure spool including a fan arranged at a forward end of the engine, a low pressure turbine rotor arranged at an aft end of the engine, a low pressure drive shaft extending along an axis and rotationally coupling the fan to receive driven rotation from the low pressure turbine rotor, a high pressure spool including a compressor rotor, a high pressure turbine rotor, and a high pressure drive shaft extending along the axis and rotationally coupling the compressor rotor to receive driven rotation from the high pressure turbine rotor, and an electric device. The electric device may include a stator having an annular core, a rotor rotationally coupled to the low pressure drive shaft and disposed about the stator in electromagnetic communication, and a microchannel cooling system arranged radially inward of the stator in thermal communication with the annular core to pass coolant for removing heat from the stator.

In some embodiments, the microchannel cooling system may include a housing. A network of micropassageways may be arranged within the housing. In some embodiments, the micropassageways may include inlet passageways for receiving coolant and outlet passageways for discharging heated coolant. In some embodiments, each inlet passageway may be connected with at least one of the outlet passageways by at least one transfer section to pass coolant in thermal communication with the annular core. In some embodiments, the inlet and outlet passageways may be arranged in alternating sequence in the circumferential direction.

In some embodiments, the stator may include electrical windings disposed radially outward of the annular core. In some embodiments, the rotor may include a magnet arranged radially outward of the stator and separated therefrom by an air gap. In some embodiments, the coolant may include air received from the fan. In some embodiments, the electric device may be one of an electric motor, an electric generator, and an electric motor-generator.

According to another aspect of the present disclosure, a gas turbine engine for use in an aircraft may include a low pressure spool including a fan arranged at a forward end of the engine, a low pressure turbine rotor arranged at an aft end of the engine, a low pressure drive shaft extending along an axis and rotationally coupling the fan to receive driven rotation from the low pressure turbine rotor, an electric device including a stator having an annular core, a rotor rotationally coupled to the low pressure drive shaft and disposed about the stator in electromagnetic communication, and a microchannel cooling system. The microchannel cooling system may be arranged radially inward of the stator in thermal communication with the annular core to pass coolant for removing heat from the stator.

In some embodiments, the microchannel cooling system may include a housing. A network of micropassageways may be arranged within the housing. The micropassageways may include inlet passageways for receiving coolant and outlet passageways for discharging heated coolant. In some embodiments, each inlet passageway may be connected with at least one of the outlet passageways by at least one transfer section to pass coolant in thermal communication with the annular core. In some embodiments, the inlet and outlet passageways may be arranged in alternating sequence in the circumferential direction.

In some embodiments, the stator may include electrical windings disposed radially outward of the annular core. In some embodiments, the rotor may include a magnet arranged radially outward of the stator and separated therefrom by an air gap. In some embodiments, the coolant may include air received from the fan. In some embodiments, the electric device may be one of an electric motor, an electric generator, and an electric motor-generator.

According to another aspect of the present disclosure, an electrical device of gas turbine engine may include a stator having an annular core, a rotor rotationally coupled to a shaft and disposed about the stator in electromagnetic communication, and a microchannel cooling system. The microchannel cooling system may be arranged in thermal communication with the annular core to pass coolant for removing heat from the stator.

These and other features of the present disclosure will become more apparent from the following description of the illustrative embodiments.

DETAILED DESCRIPTION OF THE DRAWINGS

Figure 1:
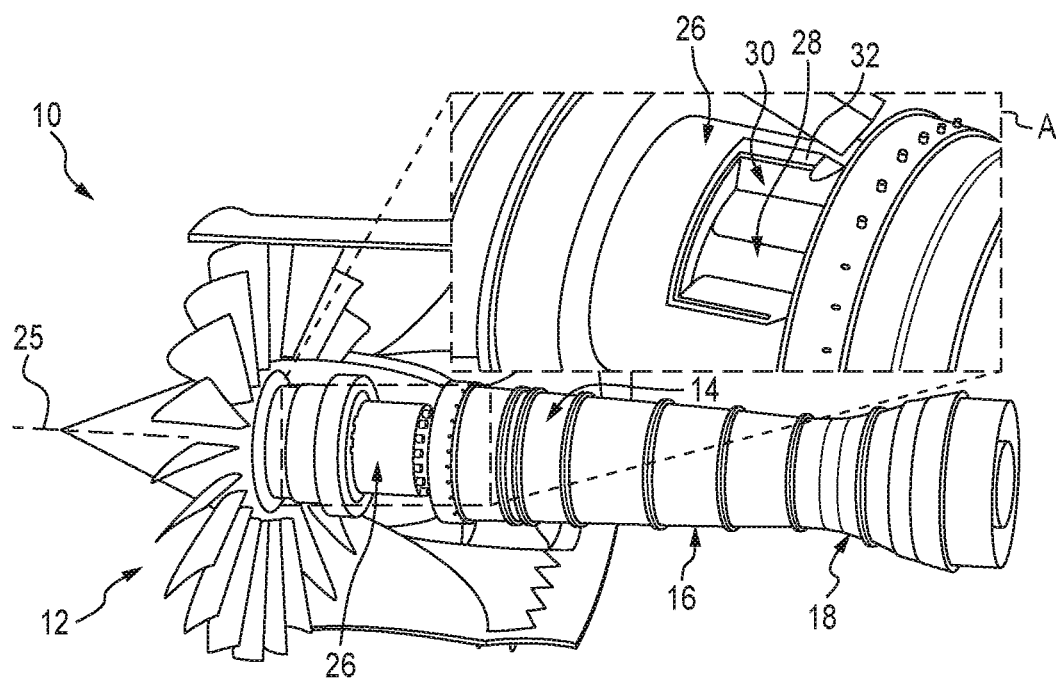
FIG. 1 is a perspective view of an illustrative embodiment of a gas turbine engine including a portion shown magnified and partially cut away to show that an electric device (which may be a motor, generator, or motor-generator) includes a rotor coupled with a shaft for rotation about a stator.

For the purposes of promoting an understanding of the principles of the disclosure, reference will now be made to a number of illustrative embodiments illustrated in the drawings and specific language will be used to describe the same.

Gas turbine engines may be adapted for various uses, such as to propel aircraft, watercraft, and/or for power generation. In such adapted vehicle use, electric motor assist may be used to supplement rotational force from the engine. Moreover, general electrical power demands on gas turbine engines adapted for such uses are rapidly increasing due to the growing number and power requirement of processors, actuators, and accessories. Drawing additional electric power from high pressure (HP) driven electric generators can limit the operation of the gas turbine engine, for example, by decreasing certain operating margins at peak demand.

The present disclosure includes descriptions of gas turbine engines that include low pressure (LP) electric devices (such as electric motors, generators, and/or motor-generators) configured to create and/or supply electric power. While electric motors and electric generators each perform respective function, motor-generators include electrical devices that can be selectively operated in a generation mode to generate electricity for use in other systems and in a drive mode to drive mechanical rotation by consumption of electrical power. Such arrangements can promote operational flexibility and power management optimization.

As shown in FIG. 1, an illustrative turbofan gas turbine engine 10 having portions cut away to show that the engine 10 includes a fan 12, a compressor 14, a combustor 16, and a turbine 18. As explained in additional detail herein, the turbine 18 illustratively includes a high pressure (HP) turbine section 20 and a low pressure (LP) turbine section 22 (see FIG. 9). The LP turbine section 22 is connected with and drives rotation of the fan 12 to draw air into the compressor 14. The HP turbine section 20 is connected with and drives rotation of the compressor 14 that compresses and delivers the air to the combustor 16. The combustor 16 mixes fuel with the compressed air from the compressor 14 and combusts the mixture. The hot, high-pressure exhaust products of the combustion reaction in the combustor 16 are directed into the turbine 18 to cause rotation of the HP and LP turbine sections 20, 22 about an axis 25 to drive the compressor 14 and the fan 12, respectively.

In the illustrative embodiment as shown in FIG. 1 and with greater zoom level in Box A, the engine 10 includes an electrical device 26. The electrical device 26 is illustratively embodied as a motor-generator adapted to either generator electrical power through conversion of rotational motion, or to convert torque into rotational motion. In some embodiments, the electrical device 26 may be only an electrical motor adapted to by assistive rotational force, only an electrical generator adapted to generate electrical power from rotational motion, or a motor-generator as in the illustrative embodiment.

As best shown in Box A of FIG. 1, an outer casing of the electrical device 26 is illustratively cut away to show that the electrical device secured with a drive shaft 28 for rotation. The electrical device 26 illustratively includes a rotor 30 secured to rotate with the shaft 28 and a stator 32 fixed relative to the rotor 30. In the illustrative embodiment, the stator 32 is formed as an annular core having an opening therethrough, and the rotor 30 is arranged radially outward of the stator 32. The rotor 30 and stator 32 are arranged in electromagnetic communication with each other.

Figure 2:
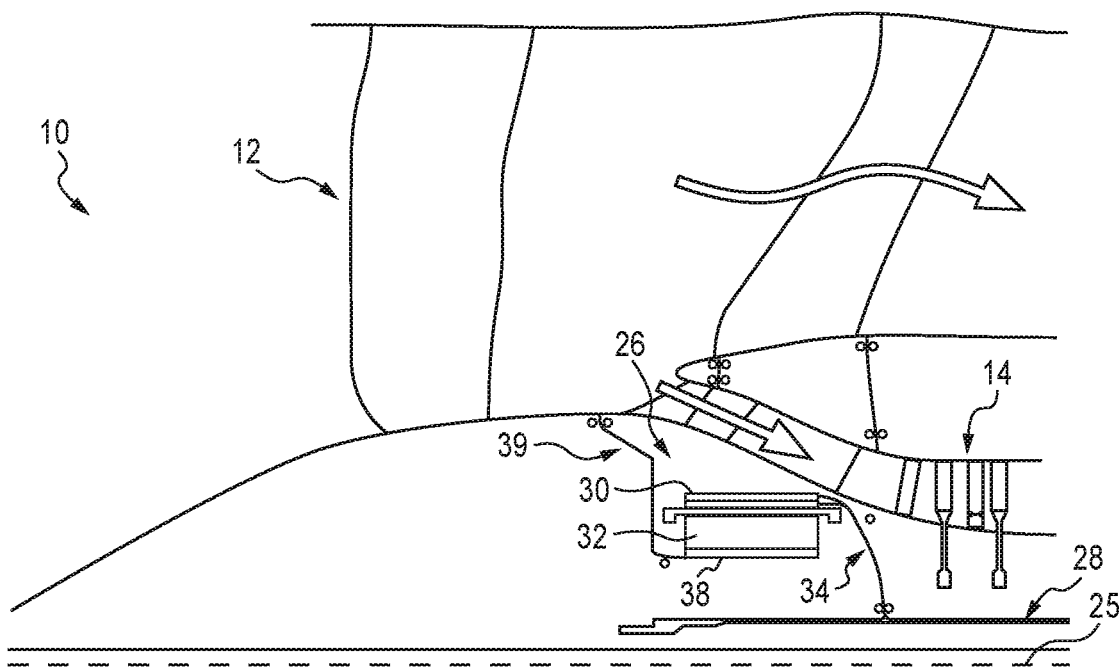
FIG. 2 is a cross-sectional view of a portion of the gas turbine engine of FIG. 1 along a central axis showing that the electric device includes a microchannel cooling system arranged in thermal communication with the stator to pass coolant therethrough to remove heat from the stator.

Referring to FIG. 2, the electrical device 26 is illustratively arranged axially between the fan 12 and the compressor 14. The rotor 30 is illustratively connected with the shaft 28 by shroud 34 and the stator 32 is connected with an inner casing of the engine 10 by structural member 39. The electrical device 26 illustratively includes a microchannel cooling system 38 for passing coolant in thermal communication with the stator 32 to remove heat therefrom.

Figure 3:
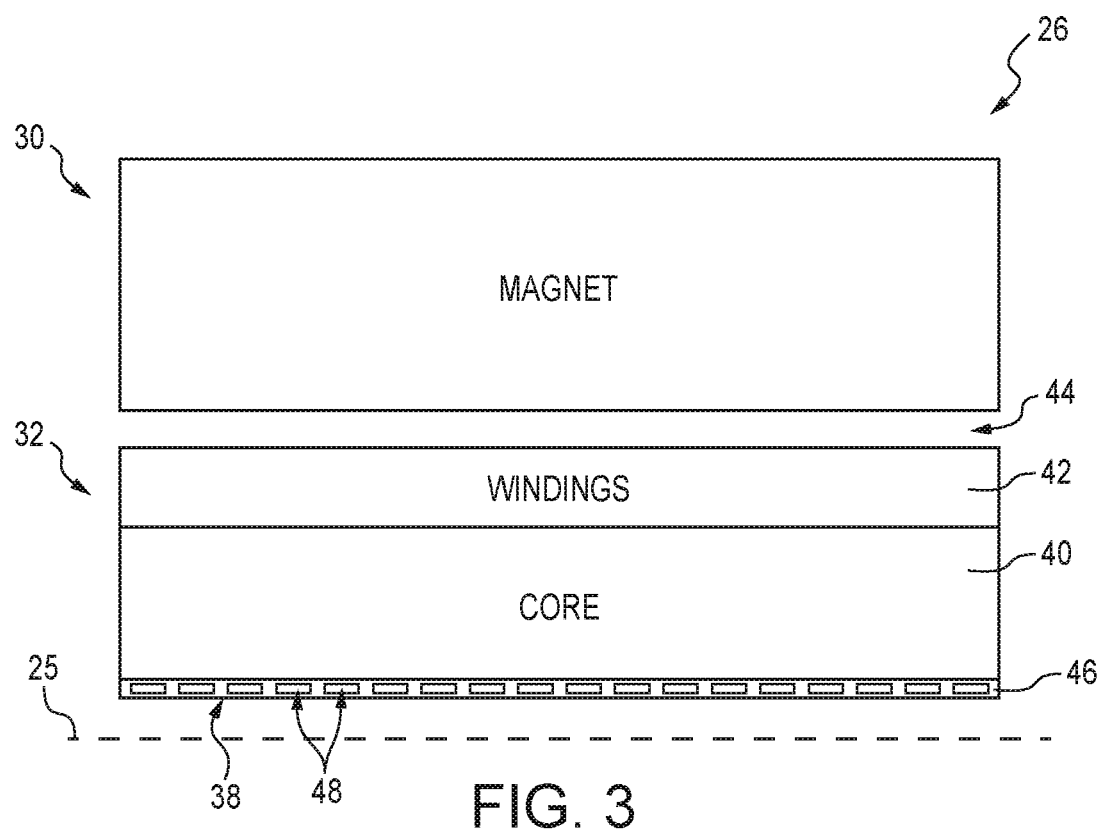
FIG. 3 is a closer view of a portion of the cross-section of FIG. 2 showing that the stator includes a core and windings disposed radially outward of the core and showing that the microchannel cooling system includes a housing and microchannels defined in the housing to conduct coolant therethrough to cool the stator.

As shown in FIG. 3, a simplified cross-section of a portion of the electrical device 28 shows that the rotor 30 includes a magnet, illustratively embodied as a permanent magnet, but in some embodiments, may include an electromagnet. The stator 32 illustratively includes a core 40 having an annular shape and windings 42 disposed radially outward of the core 40. An air gap 44 is illustratively defined between the windings 42 and the rotor 30.

In the illustrative embodiment as shown in FIG. 3, the microchannel cooling system 38 illustratively includes a housing 46 and microchannels 48 defined therein. The microchannels 48 are shown with exaggerated size to illustrate that they are passageways through which coolant is passed to remove heat from the stator 32. In the illustrative embodiment, the microchannels 48 are rectangular in shaped and about 10 microns (μm, micrometers) high and 20 microns wide, but in some embodiments, may have any suitable shape with height and width within the range of about 1 micron to about 1000 microns. The microchannels 48 are illustratively arranged evenly spaced, in a single row, circumferentially about the axis 25, but in some embodiments may include any suitable arrangement for example, multiple rows, and/or staggered placement.

In the illustrative embodiment as shown in FIG. 3, the microchannel cooling system 38 is arranged radially inward of the stator 30. The housing 46 illustratively abuts the stator 32 on a radially inward side thereof. The housing 46 transmits heat from the stator 32 to the coolant within the microchannels 48.

Figure 4:
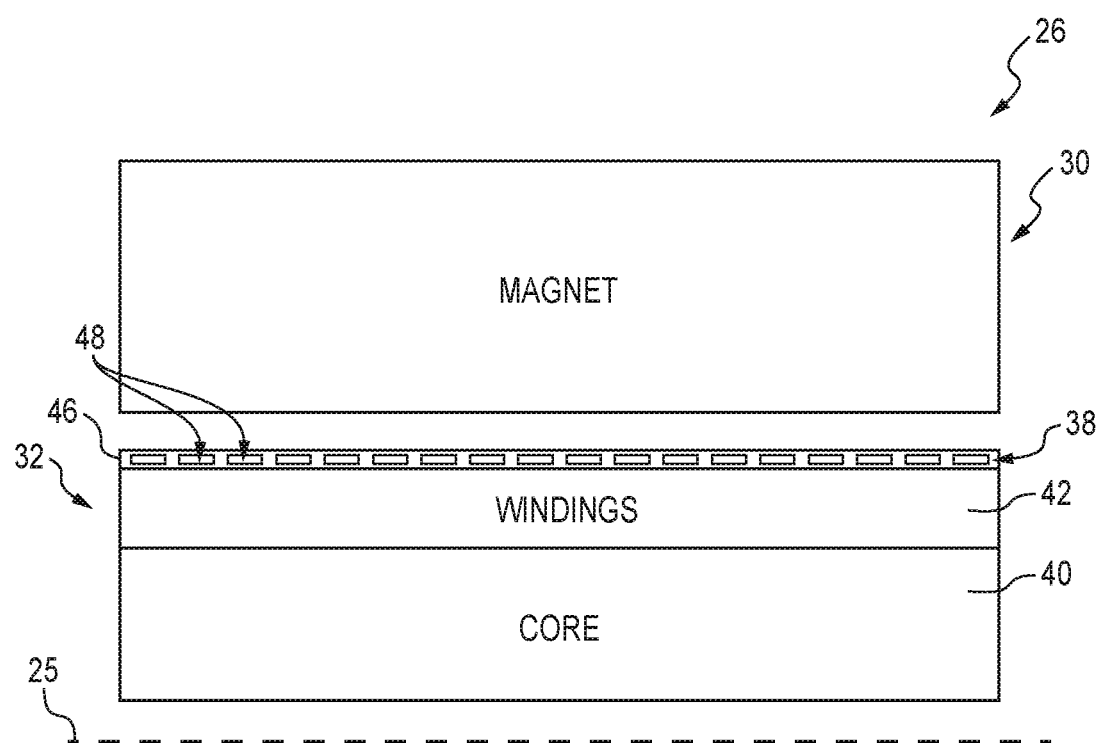
FIG. 4 is the closer cross-sectional view of FIG. 3 showing another arrangement of the microchannel cooling system in which the housing is arranged radially outward of the stator.
Figure 5:
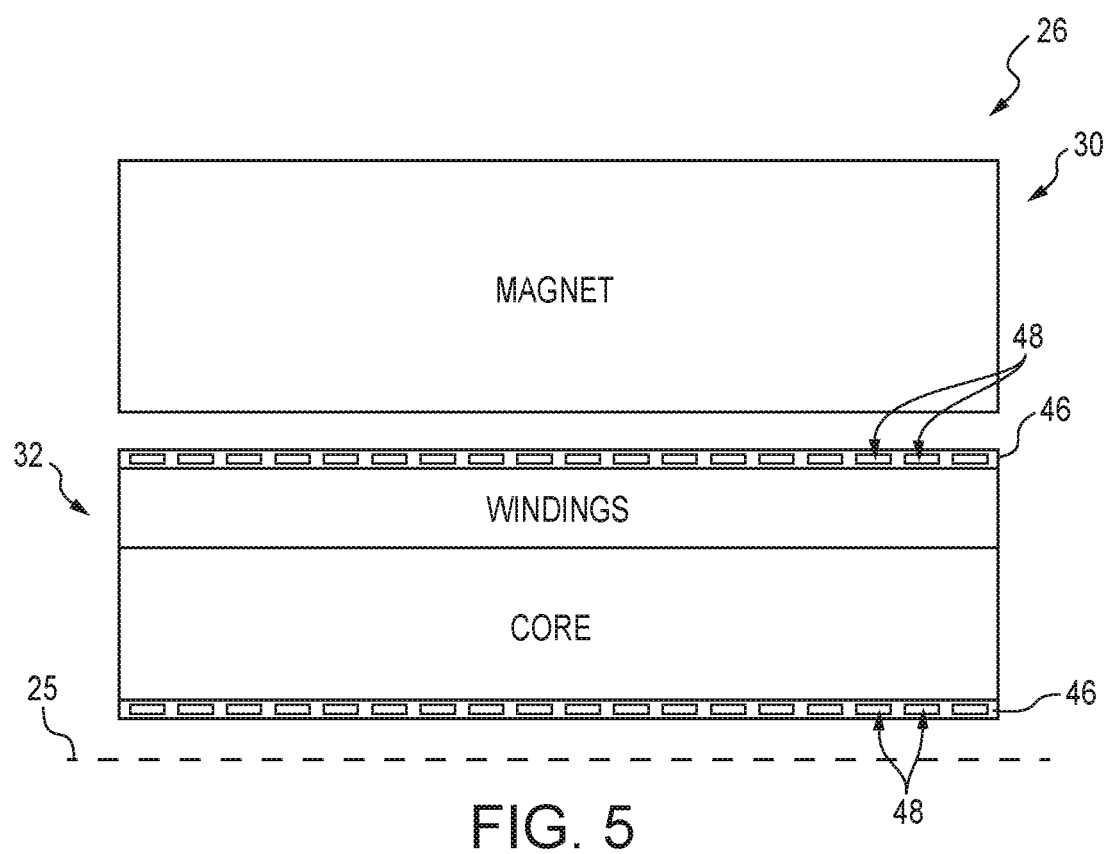
FIG. 5 is the closer cross-sectional view of FIGS. 3 and 4 showing another arrangement of the microchannel cooling system including one housing arranged radially inward of the stator and one housing arranged radially outward of the stator.

As shown in FIG. 4, in some embodiments the microchannel cooling system 38 may be arranged radially outward of the stator 32. The housing 46 may be arranged in contact with the windings 42 to remove heat from the stator 32. As shown in FIG. 5, in some embodiments, the microchannel cooling system 38 may include housings 46 each having microchannels 48, one housing 46 arranged radially inward of the stator 32 and one housing arranged radially outward of the stator 32.

Figure 6:
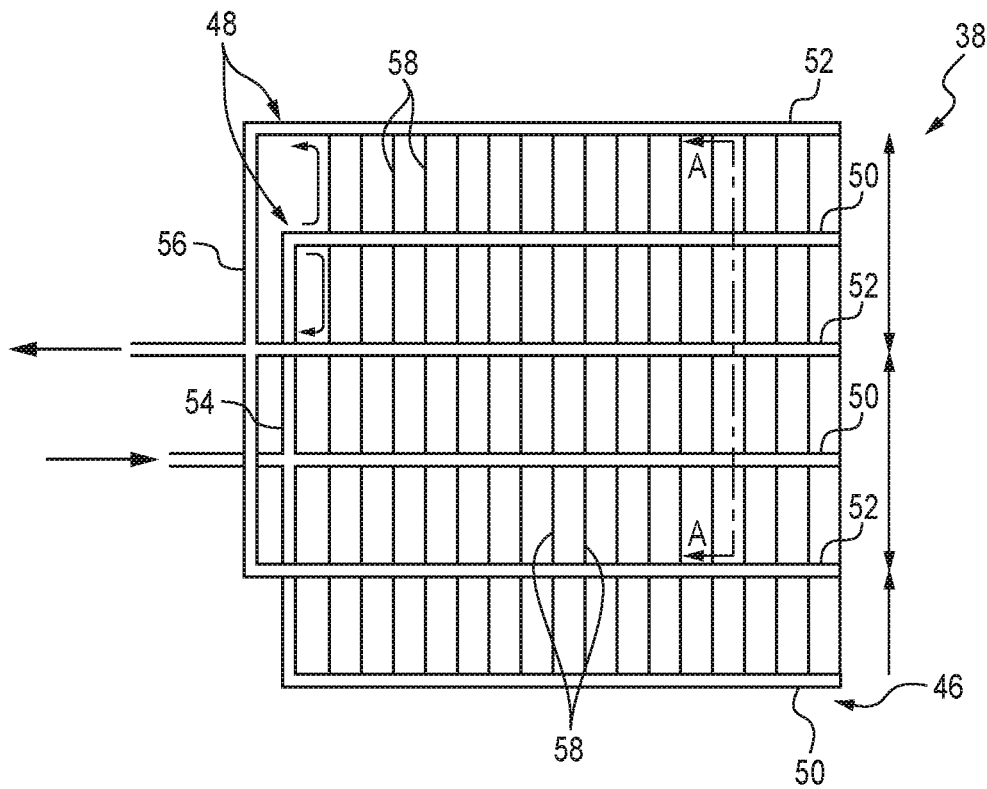
FIG. 6 is a diagrammatic view of the microchannel cooling system of FIGS. 2-5 showing that the microchannels include inlet passageways and outlet passageways arranged in alternating sequence along the circumferential direction.

As shown in FIG. 6, the microchannel cooling system 38 is illustratively shown in diagrammatic form in a single plane. The microchannels 48 illustratively include inlet passageways 50 and outlet passageways 52. Each of the inlet passageways 50 are illustratively connected by a header 54. The outlet passageways 52 are illustratively connected by a header 56. The inlet passageways 50, 52 are illustratively arranged in alternating sequence along the circumferential direction and extend longitudinally parallel to the axis 25. In the illustrative embodiment, adjacent inlet and outlet passageways 50, 52 are connected by passages 58 as transfer sections. Coolant from a pressurize source illustratively passes through the header 54 into the inlet passageways 50, through the passages 58 and into the outlet passageways 52, and out through the header 56 to a coolant receiver.

Figure 7:
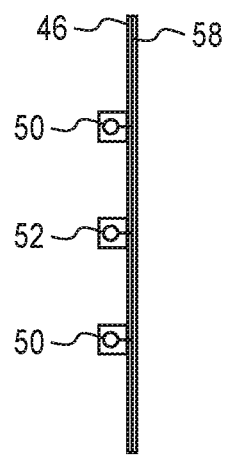
FIG. 7 is a cross-sectional view of the microchannel cooling system of FIG. 6 taken along the line A-A showing that the inlet and outlet passageways are interconnected.

Referring to FIG. 7, the passages 58 are illustratively formed smaller in cross-sectional area than the inlet and outlet passageways 50,52. For example, the passages 58 may have an (effective) diameter within the range of 1 micron to about 100 microns, while the inlet and outlet passageways 50, 52 have diameters of about 100 microns to about 1000 microns. In some embodiments, the passages 58 and passageways 50,52 may have any suitable relative shape, dimension, and/or arrangement.

Figure 8:
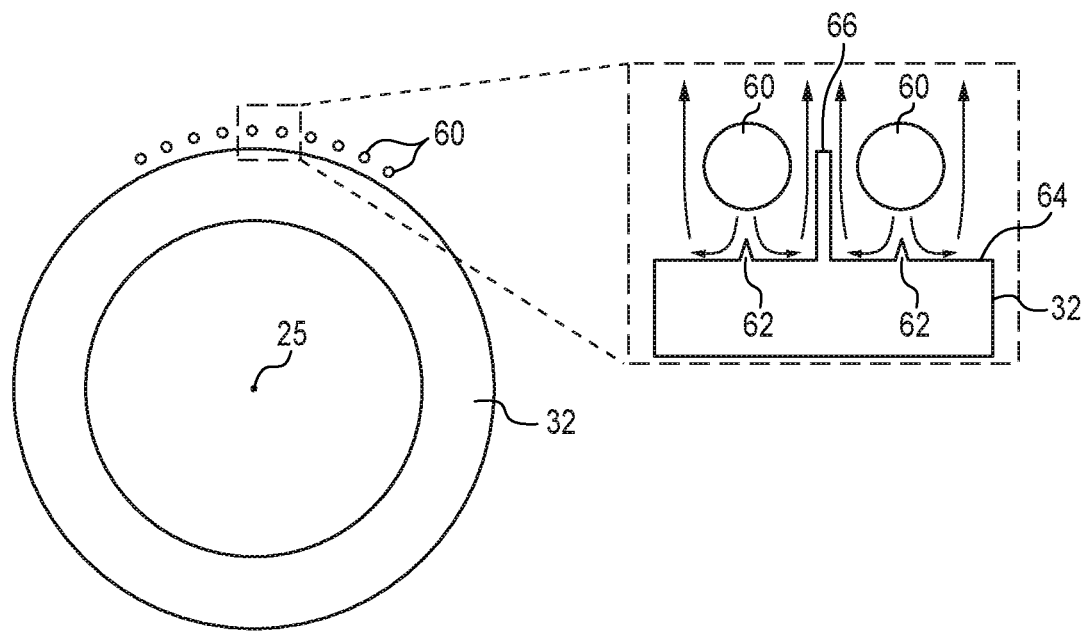
FIG. 8 is a partially diagrammatic view of the electric device of the turbofan gas turbine engine of FIG. 1 showing that the microchannel cooling system can include impingement tubes providing coolant for impingement against the stator to remove heat.

In another illustrative embodiment as shown in FIG. 8, the microchannel cooling system 38 illustratively includes impingement tubes 60. Impingement tubes 60 illustratively deliver coolant for impingement against the stator 32 to remove heat. The impingement tubes 60 may be microchannels having cross-sectional flow area within the range of about 1 to about 10000 microns. The impingement tubes 60 illustratively eject coolant (shown as arrows in the zoom view in FIG. 8) onto the stator 32.

As shown in FIG. 8, the stator 32 illustratively includes wedges 62 extending from a surface 64. The wedges 62 illustratively assist in directing the impinging coolant against the stator 32. The wedges 62 can increase the surface area available for heat transfer. A wall 66 extends from the surface 64 to assist in separating coolant flows from each impingement tube 60 to discourage crossflow. The wall 66 can increase heat transfer surface area. Coolant that impinges the stator 32 to receive heat is illustratively dispelled into the surrounding engine environment. In the illustrative embodiment, the surface 64 is embodied as an radially outer surface, but in some embodiments, may be formed as a radially inner surface with impinging coolant directed radially outward thereon.

Figure 9:
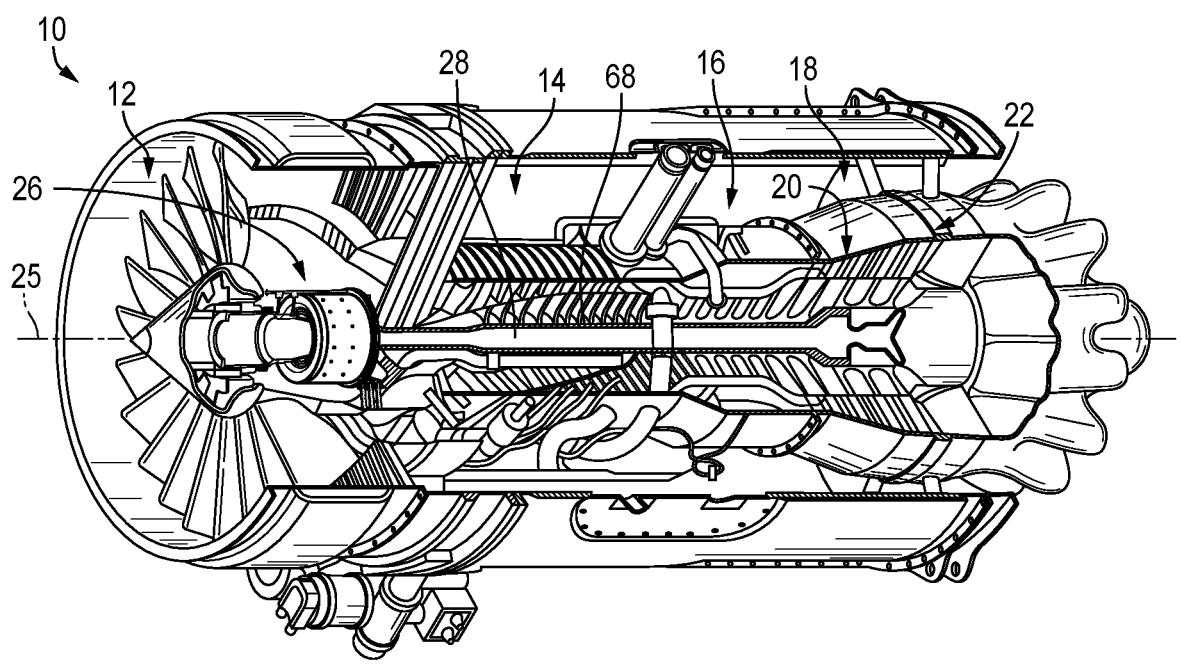
FIG. 9 is a perspective and diagrammatic view of the gas turbine engine of FIG. 1 with a portion cutaway to show that the engine includes a turbine having high and low pressure sections, a compressor connected with the high pressure section by a shaft to receive driven rotation, and a fan connected with the low pressure turbine to receive driven rotation by another shaft which is also secured with the electric device.

As shown in FIG. 9, the gas turbine engine 10 is shown with additional detail with a portion cut away to reveal the HP turbine section 20 and LP turbine section 22. The LP turbine section 22 is illustratively connected for rotational drive with the fan 12 and the electrical device 26 by the shaft 28. The HP turbine section 20 is illustratively connected with the compressor 14 to provide rotational drive by another shaft 68. In the illustrative embodiment, the shafts 28, 68 are concentric drive shafts, but in some embodiments, the engine may include any suitable power train arrangement.

A non-exhaustive list of potential coolants for removing heat from the electrical device may include any of oil, fuel, refrigerant, propylene glycol and water (PGW), air (for example, from the fan), but in some embodiments, the coolant may include any suitable fluid, and may be dedicated and/or shared with other systems. In the illustrative embodiment, the stator is arranged radially inward of the rotor. In some embodiments, the rotor may be arranged radially inward of an outer rotor. In embodiments in which the rotor is radially inward of the rotor, the microchannel cooling system may be arranged outward of the stator (opposite the air gap) and/or with any suitable arrangement.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine for use in an aircraft, the engine comprising a low pressure spool including a fan arranged at a forward end of the engine, a low pressure turbine rotor arranged at an aft end of the engine, a low pressure drive shaft extending along an axis and rotationally coupling the fan to receive driven rotation from the low pressure turbine rotor, a high pressure spool including a compressor rotor, a high pressure turbine rotor, and a high pressure drive shaft extending along the axis and rotationally coupling the compressor rotor to receive driven rotation from the high pressure turbine rotor, and an electric device including a stator having an annular core, a rotor rotationally coupled to the low pressure drive shaft and disposed about the stator in electromagnetic communication, and a microchannel cooling system arranged radially inward of the stator in thermal communication with the annular core to pass coolant for removing heat from the stator, the microchannel cooling system including a housing and a network of micropassageways within the housing, the housing abutting a radially inner side of the stator, wherein the network of micropassageways includes a first plurality of micropassageways that extend longitudinally parallel to the axis and that are spaced apart circumferentially and a second plurality of micropassageways that extend circumferentially relative to the axis and that are spaced apart axially such that the coolant flowing though the microchannel cooling system primarily only flows axially parallel with the axis and circumferentially relative to the axis.

2. The gas turbine engine of claim 1, wherein the micropassageways include inlet passageways for receiving coolant and outlet passageways for discharging heated coolant.

3. The gas turbine engine of claim 2, wherein each inlet passageway is connected with at least one of the outlet passageways by at least one transfer section to pass coolant in thermal communication with the annular core.

4. The gas turbine engine of claim 3, wherein the at least one transfer section has a cross-sectional area that is smaller than a cross-sectional area of the inlet passageways and the outlet passageways.

5. The gas turbine engine of claim 2, wherein the inlet and outlet passageways are arranged in alternating sequence in the circumferential direction.

6. The gas turbine engine of claim 5, wherein the inlet and outlet passageways extend axially and parallel with each other, wherein the coolant flows through the inlet passageway in a first axial direction and through the outlet passageway in a second axial direction opposite the first axial direction, wherein the micropassageways further include a circumferentially extending first header passageway with which an axially terminal end of each outlet passageway connects and a circumferentially extending second header passageway with which an axially terminal end of each inlet passageway connects, wherein the axially terminal end of each outlet passageway and the axially terminal end of each inlet passageway are located adjacent each other such that the first header passageway and the second header passageway are located adjacent each other, and wherein the at least one transfer section extends circumferentially between at least one outlet passageway and inlet passageway.

7. The gas turbine engine of claim 1, wherein the stator includes electrical windings disposed radially outward of the annular core.

8. The gas turbine engine of claim 1, wherein the rotor includes a magnet arranged radially outward of the stator and separated therefrom by an air gap.

9. The gas turbine engine of claim 1, wherein the coolant is air received from the fan.

10. The gas turbine engine of claim 1, wherein the electric device is one of an electric motor, an electric generator, and an electric motor-generator.

11. The gas turbine engine of claim 1, wherein the electric device is positioned between the fan and the compressor rotor.

12. A gas turbine engine for use in an aircraft, the engine comprising
a low pressure spool including a fan arranged at a forward end of the engine, a low pressure turbine rotor arranged at an aft end of the engine, a low pressure drive shaft extending along an axis and rotationally coupling the fan to receive driven rotation from the low pressure turbine rotor,
an electric device including a stator having an annular core, a rotor rotationally coupled to the low pressure drive shaft and disposed about the stator in electromagnetic communication, and
a microchannel cooling system arranged radially inward of the stator in thermal communication with the annular core to pass coolant for removing heat from the stator, the microchannel cooling system including a housing and a network of micropassageways within the housing, the housing abutting a radially inner side of the stator,
wherein the network of micropassageways includes at least one micropassageway that extends longitudinally parallel to the axis and at least one micropassageway that extends circumferentially relative to the axis such that the coolant flowing though microchannel cooling system primarily only flows axially parallel with the axis and circumferentially relative to the axis.

13. The gas turbine engine of claim 12, wherein the micropassageways include inlet passageways for receiving coolant and outlet passageways for discharging heated coolant.

14. The gas turbine engine of claim 13, wherein each inlet passageway is connected with at least one of the outlet passageways by at least one transfer section to pass coolant in thermal communication with the annular core.

15. The gas turbine engine of claim 14, wherein the inlet and outlet passageways are arranged in alternating sequence in the circumferential direction.

16. The gas turbine engine of claim 12, wherein the stator includes electrical windings disposed radially outward of the annular core.

17. The gas turbine engine of claim 12, wherein the rotor includes a magnet arranged radially outward of the stator and separated therefrom by an air gap.

18. The gas turbine engine of claim 12, wherein the coolant is air received from the fan.

19. The gas turbine engine of claim 12, wherein the electric device is one of an electric motor, an electric generator, and an electric motor-generator.

20. An electrical device of gas turbine engine, the electrical device comprising
a stator having an annular core disposed about an axis,
a rotor rotationally coupled to a shaft and disposed about the stator in electromagnetic communication, and
a microchannel cooling system arranged radially inward of the stator and in thermal communication with the annular core to pass coolant for removing heat from the stator, the microchannel cooling system including a housing and a network of micropassageways within the housing, the housing abutting a radially inner side of the stator,
wherein each micropassageway of the network of micropassageways extends longitudinally parallel to the axis or circumferentially relative to the axis such that the coolant flowing though microchannel cooling system primarily only flows axially parallel with the axis and circumferentially relative to the axis.

* * * * *